US012764005B2

(12) United States Patent
Lomen

(10) Patent No.: US 12,764,005 B2
(45) Date of Patent: Oct. 13, 2026

(54) FREQUENCY MODULATION DETECTION SYSTEMS, DEVICES, AND METHODS

(71) Applicant: The MITRE Corporation, McLean, VA (US)

(72) Inventor: Brandt Lomen, Bedford, NH (US)

(73) Assignee: The MITRE Corporation, McLean, VA (US)

(*) Notice: Subject to any disclaimer, the term of this patent is extended or adjusted under 35 U.S.C. 154(b) by 57 days.

(21) Appl. No.: 18/942,939

(22) Filed: Nov. 11, 2024

(65) Prior Publication Data

US 2026/0135741 A1 May 14, 2026

(51) Int. Cl.

| | |
|---|---|
| ***H04L 27/20*** | (2006.01) |
| ***H04L 27/10*** | (2006.01) |
| ***H04L 27/26*** | (2006.01) |

(52) U.S. Cl.

CPC ........ *H04L 27/2017* (2013.01); *H04L 27/103* (2013.01); *H04L 27/2636* (2013.01)

(58) Field of Classification Search

CPC ... G01S 7/00; G01S 7/35; G01S 13/42; G06F 15/00; H03D 3/00; H03D 3/18; H03D 3/22; H03D 3/24; H04B 1/10; H04B 1/707; H04J 13/10; H04L 27/00; H04L 27/20; H04L 27/22; H04L 27/26; H04L 27/103; H04L 27/2017; H04L 27/2636

USPC .... 329/12, 122, 304, 307, 345; 375/85, 219, 375/295, 304, 316, 327, 329, 346

See application file for complete search history.

(56) References Cited

U.S. PATENT DOCUMENTS

| | | | | |
|---|---|---|---|---|
| 4,584,534 | A | 4/1986 | Lijphart | |
| 4,989,220 | A | 1/1991 | Serrone | |
| 6,317,074 | B1 * | 11/2001 | Johnson | H03B 23/00 342/128 |
| 7,564,929 | B2 * | 7/2009 | Lopez Villegas | H04L 27/2276 329/304 |
| 9,966,989 | B2 | 5/2018 | Bergamo | |

FOREIGN PATENT DOCUMENTS

| | | | | |
|---|---|---|---|---|
| CN | 106443604 B | | 9/2018 | |
| CN | 115420947 A | * | 12/2022 | G01R 23/02 |
| JP | S61-261945 A | | 11/1986 | |

(Continued)

OTHER PUBLICATIONS

Z. Zhang "RF Steganography via LMF Chirp Radar Signals", IEEE, Jun. 7, 2018 (Year: 2018).*

(Continued)

*Primary Examiner* — Shawkat M Ali

(74) *Attorney, Agent, or Firm* — Morrison & Foerster LLP

(57) ABSTRACT

Systems, devices, and methods for detecting frequency modulation information are disclosed. For example, these systems, devices, and methods are used for detecting phase-shift keying (PSK) information, linear frequency modulation (LFM) information, and signal source direction. In some embodiments, the method comprises receiving a first signal, receiving a second signal, which is a delayed version of the first signal, mixing the first signal and the second signal to generate a mixed signal, and determining, based on the mixed signal, one or more of the PSK information, the LFM in formation, and the signal source direction.

21 Claims, 7 Drawing Sheets

(56) References Cited

FOREIGN PATENT DOCUMENTS

| | | | |
|---|---|---|---|
| KR | 10-2325071 | B1 | 11/2021 |
| WO | 2017/184743 | A1 | 10/2017 |

OTHER PUBLICATIONS

Abdalla et al. "Design and Implementation of Digital IF Waveform Generation, Acquisition, and Receiver circuits for Radar Systems Applications," 2020 12th International Conference on Electrical Engineering (ICEENG), Jul. 7-9, 2020, Cairo, Egypt; pp. 217-222.
Ahmad et al. "Scalable 2x2 MIMO Radar Demonstrator with BPSK Data Communication at 79 GHz," Proceedings of the 17th European Radar Conference, Jan. 10-15, 2021, Utrecht, Netherlands; pp. 234-237.
Eliezer et al. "A Multi-Mode Software-Defined CMOS BPSK Receiver SoC for the Newly Enhanced WWVB Atomic Clock Broadcast," 2014 IEEE Radio Frequency Integrated Circuits Symposium, Jun. 1-3, 2014, Tampa, Florida, USA; pp. 385-388.
Siligaris et al. "A 60 GHz Carrier Recovery Circuit in CMOS 28nm FD SOI for BPSK/QPSK PLL-less High Data Rate Receivers," Proceedings of the 18th European Microwave Integrated Circuits Conference, Sep. 18-19, 2023, Berlin, Germany; pp. 233-236.
Yan et al. (May 2011). "An Ultra-Low-Power BPSK Receiver and Demodulator Based on Injection-Locked Oscillators," IEEE Transactions on Microwave Theory and Techniques 59(5): 1339-1349.

* cited by examiner

FREQUENCY MODULATION DETECTION SYSTEMS, DEVICES, AND METHODS

TECHNICAL FIELD

This disclosure generally relates to systems, devices, and methods for detecting frequency modulation information. More particularly, this disclosure relates to systems, devices, and methods for detecting phase-shift keying (PSK) information, linear frequency modulation (LFM) information, and signal source direction.

BACKGROUND

To perform Signal Intelligence (SIGINT), it may be necessary to survey large bands of the electromagnetic spectrum (EMS) simultaneously. However, existing methods of digitization via Analog-to-Digital Converters (ADC) and digital signal processing (DSP) may require computationally expensive and complex operations. These solutions may require wide bandwidth sampling to sufficiently survey an environment. Computationally expensive and power consuming methods such as envelope detection may be performed. For instance, to survey an environment comprising 1 GHz signals, at least a 2 GHz sampling rate and 10-100 watts of power are required, making implementation of SIGINT challenging in Size, Weight, Power, and Cost (SWaP+C) solutions.

SUMMARY

This disclosure relates to detecting frequency modulation information, such as PSK information, LFM information, and signal source direction. In some embodiments, the disclosed system receives a signal from its environment. This signal may be, for example, a radar signal, a jamming signal, or a signal associated with a message. The signal may be mixed with a delayed version of itself (e.g., a second signal). By determining the frequency of the mixed signal, the system can determine one or more of PSK information and LFM information associated with the signal. For example, the mixed signal comprises a transition, which may be caused by a phase discontinuity at the frequency of the mixed signal. Based on the transition, the system can determine a bit transition in the PSK information. As another example, based on the frequency of the mixed signal and the delay between the first and second signals, the system can determine one or more of the chirp rate of the signal and the bandwidth of the signal.

In some embodiments, the system receives a third signal from the environment. The first signal and the third signal may be transmitted from the same signal source and received at different points (e.g., different antennas) of the system. The third signal may be mixed with the first signal to generate a second mixed signal. Based on a delay of the second mixed signal and the delay between the first and second signals, the system can determine an angle of the signal source (e.g., a signal source direction, a direction of a radar station transmitting the incoming signal).

The disclosed systems, devices, and methods allow SIGINT to be performed (e.g., in situations where information about the electromagnetic environment may not be known) and implemented using SWaP+C solutions that are suitable for mobile applications. By mixing a signal under analysis with a delayed version of itself, the sampling rate for performing SIGINT may be greatly reduced, compared to existing solutions such as envelope detection. Reducing the sampling rate reduces power consumption and computational complexity, allowing lower-cost and smaller hardware (e.g., a slower ADC, a lower power-consuming processor, a general purpose processor, a lower-cost processor such as a Raspberry Pi). Additionally, the disclosed systems, devices, and methods allow SIGINT to be performed for different frequency bands and/or different sources simultaneously, which enables wide bandwidth surveillance at a lower cost.

In some embodiments, a method for determining frequency modulation information comprises: receiving a first signal; receiving a second signal, the second signal being a delayed version of the first signal; mixing the first signal and the second signal to generate a mixed signal; and determining, based on the mixed signal, one or more of phase-shift keying (PSK) information associated with the first signal and linear frequency modulation (LFM) information associated with the first signal.

In some embodiments, determining the PSK information comprises in accordance with a determination that the mixed signal comprises a transition, determining a bit transition in the PSK information. The transition is caused by a discontinuity in the first signal.

In some embodiments, determining the LFM information comprises determining a bandwidth of the first signal based on (1) a delay between the first signal and the second signal, (2) a pulse width of the first signal, and (3) the mixed signal.

In some embodiments, the pulse width of the first signal is determined via performing Fast Fourier Transform (FFT) to determine a plurality of frequency bins and identifying a period corresponding to the frequency bin of the plurality of frequency bins having the highest energy.

In some embodiments, determining the LFM information comprises determining a chirp rate of the first signal based on (1) a delay between the first signal and the second signal, and (2) the mixed signal.

In some embodiments, the method further comprises: receiving a third signal; mixing the first signal and the third signal to generate a second mixed signal; determining a delay of the third signal based on the second mixed signal; and determining, based on (1) a delay between the first signal and the second signal, and (2) the delay of the third signal, an angle of a source of the first signal.

In some embodiments, the method further comprises generating a third mixed signal. The angle of the source is determined further based on the third mixed signal.

In some embodiments, the angle of the source is determined further based on a loss associated with mixing the first signal and the third signal.

In some embodiments, the loss is determined via calibration.

In some embodiments, the method comprises concurrently with determining the angle of the first source, determining an angle of a second source of a fourth signal. The fourth signal comprises frequency components different than frequency components of the first signal.

In some embodiments, the first and second signals are received at a first mixer and the third signal is received at a second mixer.

In some embodiments, a frequency of the first signal is 2-18 GHz.

In some embodiments, the method further comprises: receiving a third signal, the third signal comprising different frequency components than frequency components of the first signal; receiving a fourth signal, the fourth signal being a delayed version of the third signal; mixing the third signal and the fourth signal to generate a second mixed signal; and concurrently with determining the one or more of the first PSK information and the first LFM information, determining, based on the second mixed signal, one or more of second PSK information associated with the third signal and second LFM information associated with the third signal.

In some embodiments, a system is configured to perform any of the above methods.

In some embodiments, a system comprises a mixer configured to: receive a first signal; receive a second signal, the second signal being a delayed version of the first signal; and mix the first signal and the second signal to generate a mixed signal. The system further comprises one or more processors configured to perform a method comprising determining, based on the mixed signal, one or more of PSK information associated with the first signal and LFM information associated with the first signal.

In some embodiments, the system further comprises an analog-to-digital converter (ADC). The ADC is configured to convert the mixed signal into a digital signal, and the one or more of the PSK information and the LFM information are determined based on the digital signal.

In some embodiments, determining the PSK information comprises in accordance with a determination that the mixed signal comprises a transition, determining a bit transition in the PSK information. The transition is caused by a discontinuity in the first signal.

In some embodiments, determining the LFM information comprises determining a bandwidth of the first signal based on (1) a delay between the first signal and the second signal, (2) a pulse width of the first signal, and (3) the mixed signal.

In some embodiments, determining the LFM information comprises determining a chirp rate of the first signal based on (1) a delay between the first signal and the second signal, and (2) the mixed signal.

In some embodiments, the system comprises a second mixer configured to: receive a third signal; and mix the first signal and the third signal to generate a second mixed signal. The method further comprises: determining a delay of the third signal based on the second mixed signal; and determining, based on a delay between (1) the first signal and the second signal, and (2) the delay of the third signal, an angle of a source of the first signal.

In some embodiments, the system further comprises a second mixer configured to: receive a third signal, the third signal comprising different frequency components than frequency components of the first signal; receive a fourth signal, the fourth signal being a delayed version of the third signal; and mix the third signal and the fourth signal to generate a second mixed signal. The method further comprises concurrently with determining the one or more of the first PSK information and the first LFM information, determining, based on the second mixed signal, one or more of second PSK information associated with the third signal and second LFM information associated with the third signal.

In some embodiments, a non-transitory computer-readable medium stores one or more instructions, which, when executed by one or more processors of a system, cause the system to perform a method comprising: receiving a first signal; receiving a second signal, the second signal being a delayed version of the first signal; mixing the first signal and the second signal to generate a mixed signal; and determining, based on the mixed signal, one or more of PSK information associated with the first signal and LFM information associated with the first signal.

In some embodiments, a non-transitory computer-readable medium stores one or more instructions, which, when executed by one or more processors of a system, cause the system to perform any of the above methods.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DETAILED DESCRIPTION

Figure 1:
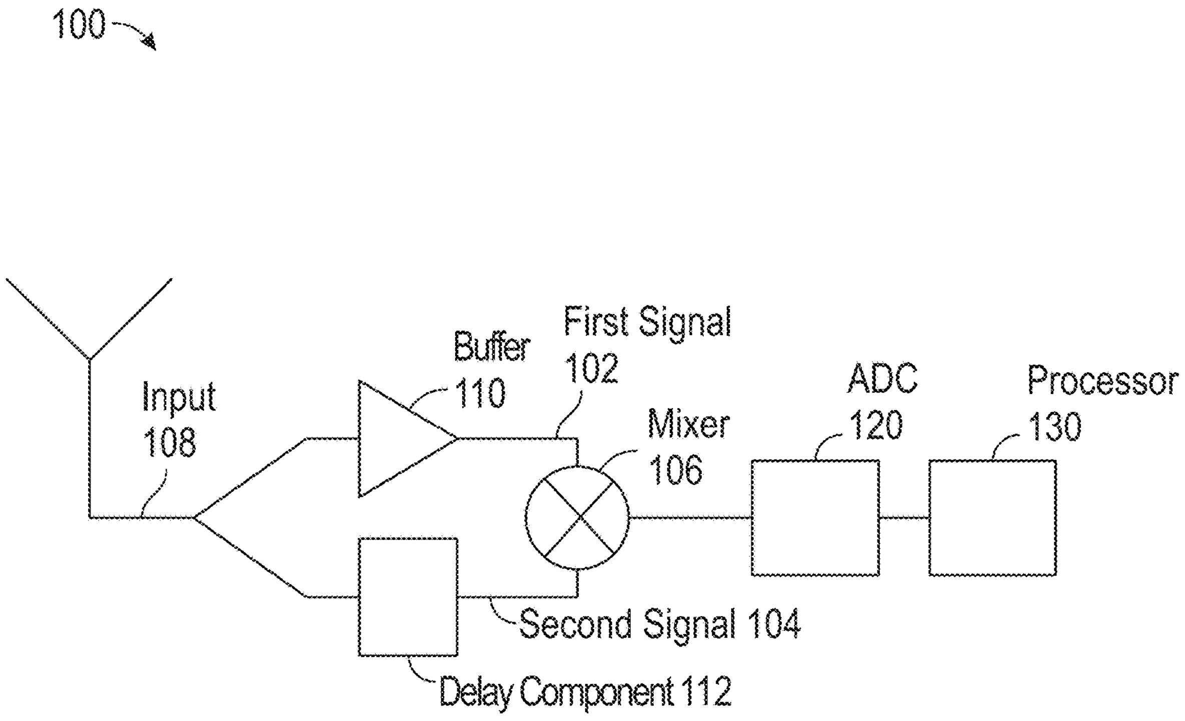
FIG. 1 illustrates an exemplary frequency modulation information detection system, according to embodiments of this disclosure.

In the following description of embodiments, reference is made to the accompanying drawings which form a part hereof, and in which it is shown by way of illustration specific embodiments which can be practiced. It is to be understood that other embodiments can be used, and structural changes can be made without departing from the scope of the disclosed embodiments.

This disclosure relates to detecting frequency modulation information, such as PSK information, LFM information, and signal source direction. In some embodiments, the disclosed system receives a signal from its environment, such as a signal being surveyed. This signal may be a radar signal, a jamming signal, or a signal associated with a message. The signal may be mixed with a delayed version of itself (e.g., a second signal). By determining the frequency of the mixed signal, the system can determine one or more of PSK information and LFM information associated with the signal. For example, the mixed signal comprises a transition, which may be caused by a phase discontinuity at the frequency of the mixed signal. Based on the transition, the system can determine a bit transition in the PSK information (e.g., in binary PSK). As another example, based on the frequency of the mixed signal and the delay between the first and second signals, the system can determine one or more of the chirp rate of the signal and the bandwidth of the signal. For instance, the system can determine the signal bandwidth based on the frequency of the mixed signal, the delay between the first and second signals, and a pulse width of the signal.

In some embodiments, the system receives a third signal from the environment. The first signal and the third signal may be transmitted from the same signal source and received at different points (e.g., different antennas) of the system. The third signal may be mixed with the first signal to generate a second mixed signal. Based on a delay of the second mixed signal and the delay between the first and second signals, the system can determine an angle of the signal source (e.g., a signal source direction, a direction of a radar station transmitting the incoming signal). For example, based on the delay of the second mixed signal and the delay between the first and second signals, the system can determine a difference between (1) a distance between the signal source and a point of receipt of the first signal and (2) a distance between the signal source and a point of receipt of the third signal. From this, the system can determine the angle of the signal source.

The disclosed systems, devices, and methods allow SIGINT to be performed (in situations where information about the electromagnetic environment may not be known) and implemented using SWaP+C solutions that are suitable for mobile applications. By mixing a signal under analysis with a delayed version of itself, the sampling rate for performing SIGINT may be greatly reduced, compared to existing solutions such as envelope detection. Reducing the sampling rate reduces power consumption and computational complexity, allowing lower-cost and smaller hardware (e.g., a slower ADC, a lower power-consuming processor, a general purpose processor, a lower-cost processor such as a Raspberry Pi). For example, instead of sampling at 2 GHz or greater, the disclosed systems, devices, and methods allow the sampling rate to be reduced to 1-2 MHz, reducing power consumption and speed requirements by orders of magnitude. Additionally, the disclosed systems, devices, and methods allow SIGINT to be performed for different frequency bands and/or different sources simultaneously, which enables wide bandwidth surveillance (e.g., 2-18 GHz) at a lower cost.

FIG. 1 illustrates an exemplary frequency modulation information detection system 100, according to embodiments of this disclosure. In some embodiments, the system 100 is a SIGINT system for surveying its electromagnetic environment. For example, the system 100 is part of a mobile system deployed to the field for determining information of signals communicated in the environment. These signals may be various types of signals, including but not limited to radar signals, jamming signals, frequency modulated signals associated with messages or device instructions, phase modulation signals associated with messages or data, and incidental signals within the environment. The system 100 may be part of a mobile platform, such as a handset. The system 100 may be part of a larger platform, such as a base station for transmitting signals, receiving signals, and performing intelligence on signals in its environment.

In some embodiments, the system 100 comprises a mixer 106 and a processor 130. In some embodiments, the system 100 comprises an ADC 120 coupled to the mixer 106 and the processor 130. In some embodiments, the ADC 120 and processor 130 are part of one component. As described in more detail herein, because the disclosed systems allow a lower power-consuming processor (e.g., a general purpose processor, a lower-cost processor such as a Raspberry Pi) for performing SIGINT, the system 100 is configured to perform analog-to-digital conversion for converting data readable by the processor. In some embodiments, the mixer 106 is coupled to the processor 130. It should be appreciated that the system 100 may comprise different configurations from those described for detecting frequency modulation information.

In some embodiments, the mixer 106 is configured to receive a first signal 102 and a second signal 104. The first signal 102 may be received at the RF or LO input of the mixer 106, and the second signal 104 may be received at the other input of the mixer 106. In some embodiments, the first signal 102 is received via input 108. For example, the first signal 102 is associated with a part of an environment being surveyed by the system 100. For example, the system 100 is performing SIGINT of its environment, and the first signal 102 may be from a signal communicated in the environment, such as a radar signal, a jamming signal, or a frequency modulated signal associated with a message or device instructions.

In some embodiments, the first signal 102 is received via an antenna coupled to the input 108. The antenna may be part of system 100 or coupled to the system 100 via an interface of the system 100.

In some embodiments, a frequency of the first signal 102 is 2-18 GHz. Prior to receiving the first signal 102 at the mixer 106, the first signal 102 may be buffered by buffer 110.

In some embodiments, the second signal 104 is a delayed version of the first signal 102. As illustrated, the second signal 104 may be delayed by the delay component 112. The delay component 112 may shift the phase of the first signal 102 to output the second signal 104. In some embodiments, the delay component 112 is controlled by the processor 130. For example, the processor 130 determines an amount of delay applied by the delay component 112 on the first signal 102.

It should be appreciated that the first signal 102 and the second signal 104 may be processed differently than illustrated. For example, the first signal 102 may not be buffered prior to the mixer 106 receiving the first signal. As another example, the first signal 102 and/or the second signal 104 may be further processed, in addition to the illustrated steps.

In some embodiments, the mixer 106 is configured to mix the first signal 102 and the second signal 104 to generate a mixed signal. In some embodiments, the mixed signal is provided to the ADC 120 and/or the processor 130 for performing the frequency modulation information detection operations described herein (e.g., determining one or more of PSK information associated with the first signal 102, LFM information associated with the first signal 102, an angle of a source associated with the first signal 102).

In some embodiments, the PSK information associated with the first signal 102 is determined based on the mixed signal. For example, the first signal 102 is a frequency modulated signal encoded under the binary PSK (BPSK) scheme. For instance, the first signal 102 may be a signal having a frequency and a first phase or a second phase, the first phase associated with a first state (e.g., a 1 bit or a 0 bit) of the BPSK scheme and the second phase associated with a second state (e.g., a 0 bit or a 1 bit) of the BPSK scheme. The second phase may be antiphase relative to the first phase (e.g., 180 degrees apart).

In some embodiments, when there is no transition in the PSK information associated with the portion of the first signal being analyzed (e.g., there is no 1 to 0 transition or 0 to 1 transition in the PSK information), the mixed signal causes a first output, which may be a signal used by system 100 (e.g., processor 130) to determine the PSK information. For example, because the mixed signal is the first signal mixed with the delayed version of itself, the mixed signal would have a frequency of zero (i.e., DC) and cause a first output, such as 0.8V, as illustrated in FIG. 2, described in more detail below.

When there is a bit transition in the PSK information (e.g., there is a 1 to 0 transition or a 0 to 1 transition in the PSK information) associated with the portion of the first signal being analyzed, the mixed signal causes a second output, which may be a signal used by system 100 (e.g., processor 130) to determine the PSK information. For example, because the first state is associated with the first phase and the second state is associated with the second phase, a bit transition would cause a discontinuity in the portion of the first signal, transiting from the first phase to the second phase (e.g., a 0 to 1 transition) or from the second phase to the first phase (e.g., a 1 to 0 transition). The discontinuity would cause a second output, such as −0.5V, as illustrated in FIG. 2, described in more detail below.

Figure 2:
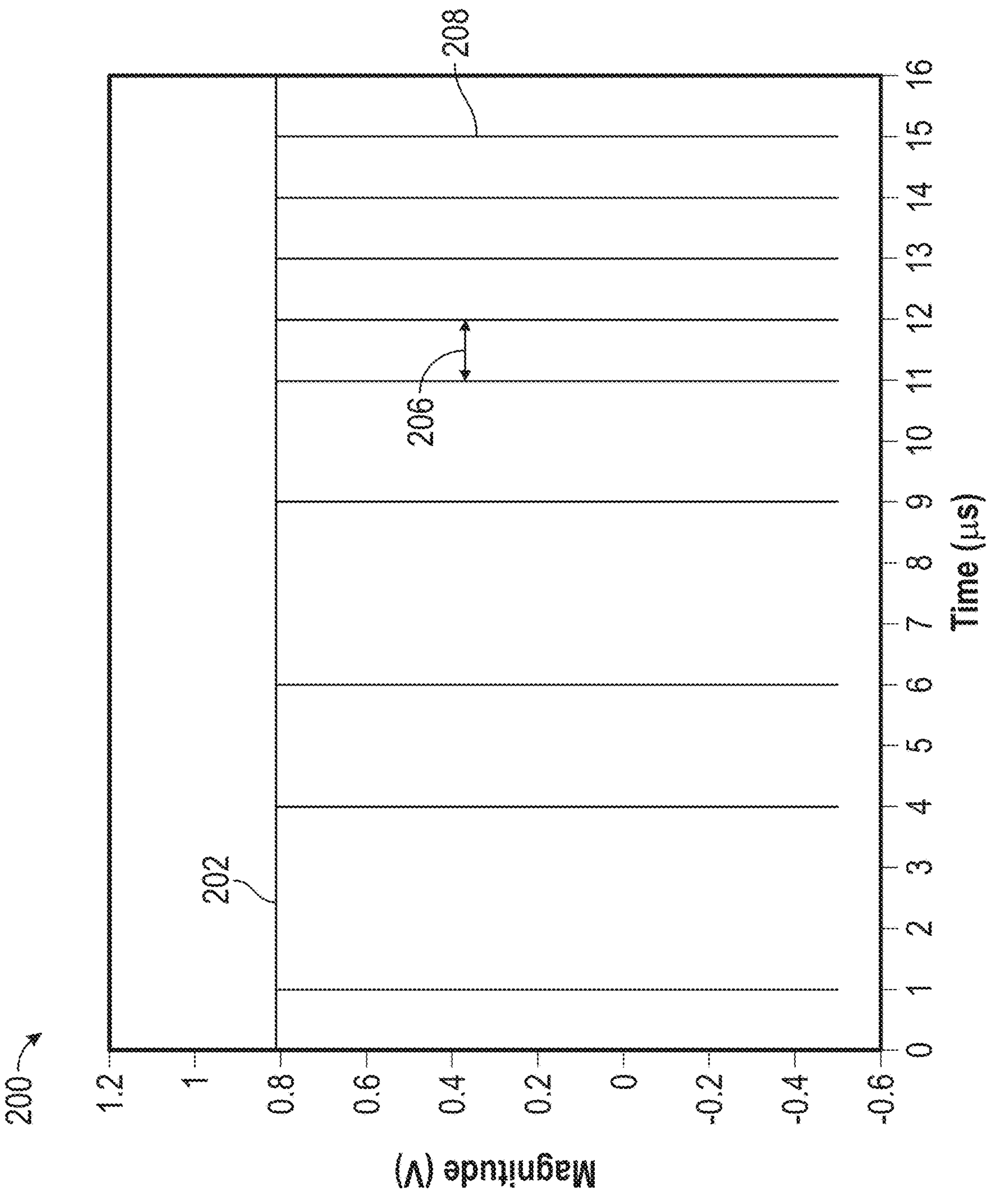
FIG. 2 illustrates exemplary waveforms for detecting frequency modulation information, according to embodiments of this disclosure.

FIG. 2 illustrates exemplary waveforms for detecting frequency modulation information, according to embodiments of this disclosure. FIG. 2 shows examples of outputs 202 caused by the mixed signal (e.g., from mixer 106) for determining PSK information. For example, as illustrated the first signal 102 has an example pulse width 206 of 1 μs, as indicated by the 1 μs markers on the horizontal axis.

As illustrated in FIG. 2, the output 202 has a first output of 0.8V corresponding to the first pulse of the first signal from time=0 to time=1 μs, indicating that the first signal does not comprise a bit transition during this time. Around time=1 μs, the output 202 has a second output of −0.5V (e.g., the output 202 transitions from 0.8V to −0.5V before time=1 μs and from −0.5V to 0.8V after time=1 μs), indicating that the first signal comprises a bit transition at this time (e.g., a 0 to 1 transition or a 1 to 0 transition, as described above). The output 202 has the first output of 0.8V corresponding to the second to fourth pulse of the first signal from time=1 μs to time=4 μs, indicating that the first signal does not comprise a bit transition during this time. At time=4 μs, the output 202 has the second output of −0.5V (e.g., the output 202 transitions from 0.8V to −0.5V before time=4 μs and from −0.5V to 0.8V after time=4 μs), indicating that the first signal comprises a bit transition at this time (e.g., a 1 to 0 transition or a 0 to 1 transition, as described above). For instance, in the first five pulses, the first signal may comprise the data [1,0,0,0,1] or [0,1,1,1,0] because the system 100 determines bit transitions between the first and second pulse and between the fourth and fifth pulses.

Although FIG. 2 illustrates the voltage transitions of output 202 as vertical lines, it should be appreciated that the vertical lines may correspond to high-to-low and low-to-high voltage transitions having non-zero fall and rise times (e.g., the output 202 transitions from 0.8V to −0.5V before time=1 μs and from −0.5V to 0.8V after time=1 μs), which may be short compare to the illustrated 16 μs duration.

In some embodiments, the pulse width of the first signal is determined based on a time between adjacent transitions. For example, the pulse width of the first signal may be determined based on the time between time=0 and the first transition at time=1 μs, a time between the transition at time=9 μs and the transition at time=10 μs, and so on. Based on the determined pulse width, the number of non-transitioning bits can be determined. For example, in accordance with a determination of 1 μs pulse width, the system determines that three 1's or three 0's are in the first signal between time=1 μs and time=4 μs.

Therefore, in this example, the portion of the first signal associated with FIG. 2 may comprise the data [1,0,0,0,1,1,0,0,0,1,1,0,1,0,1,0] and/or [0,1,1,1,0,0,1,1,1,0,0,1,0,1,0,1]. In some embodiments, the initial condition of the signal is known (e.g., a state of a pulse is known), and from the initial condition, the exact data may be determined. In some embodiments, one or more parameters associated with the signal are known (e.g., it is known that the signal starts with the data [1,0,0,0], such as based on a handshake between the transmitting system and system 100), and based on the one or more parameters, the exact data may be determined. It should be appreciated that the voltages and the pulse widths described with respect to FIG. 2 are exemplary.

Returning to FIG. 1, the system 100 may be configured to determine LFM information based on the mixed signal (e.g., from mixer 106). For example, the chirp rate of the first signal may be determined based on (1) a delay between the first signal 102 and the second signal 104, and (2) the mixed signal. Because the second signal 104 is a delayed version of the first signal 102, there may be a frequency difference between the first signal 102 and the second signal 104, since the frequency modulation of the second signal 104 may lag the frequency modulation of the first signal 102. Because the first and second signals are mixed, the frequency of the mixed signal (e.g., from mixer 106) would be the frequency difference between the first and second signals. In some embodiments, the difference increases proportionally with increasing chirp rate. If the delay between the first signal 102 and the second 104 is known, then the chirp rate of the LFM can be determined based on the following relationship:

$$\text{Rate} = \frac{f_{IF}}{\tau_d} \tag{1}$$

Where $f_{IF}$ is the frequency of the mixed signal and $\tau_d$ is the delay between the first signal 102 and the second 104. In some embodiments, $f_{IF}$ is determined by the processor 130, for example, via spectral analysis of the mixed signal. In some embodiments, $\tau_d$ is known because this is a delay that may be defined by the system 100 (e.g., by adjusting delay component 112). From the chirp rate, data encoded in the first signal may be determined.

As another example, the first signal 102 may be an LFM signal, and the bandwidth of the first signal 102 may be determined based on (1) a delay between the first signal 102 and the second signal 104, (2) a pulse width of the first signal 102, and (3) the mixed signal. If the delay between the first signal 102 and the second 104, and the pulse width of the LFM signal are known, then the chirp rate of the LFM can be determined based on the following relationship:

$$\text{Bandwidth} = \frac{f_{IF}}{\tau_d} \times \text{pulse width} \tag{2}$$

Where $f_{IF}$ is the frequency of the mixed signal, $\tau_d$ is the delay between the first signal 102 and the second 104, and the pulse width is the pulse width of the LFM signal. In some embodiments, $f_{IF}$ and the pulse width are determined by the processor 130. In some embodiments, the pulse width of the first signal is determined via performing Fast Fourier Transform (FFT). The frequency bins of the FFT results are determined, and the period corresponding to the bin having the highest energy may be the pulse width.

In some embodiments, $\tau_d$ is known because this is a delay that may be defined by the system 100 (e.g., by adjusting delay component 112). Determining the LFM bandwidth provides additional intelligence regarding the first signal 102.

In some embodiments, batch FFT is performed, for instance, when a microprocessor is used for determining frequency modulation information. In some embodiments, sliding window FFT is performed, for instance, when an FPGA is used for determining frequency modulation information.

In some embodiments, the amplitude of the first signal 102 is determined by determining an amount of energy associated with the FFT results. In some embodiments, the disclosed systems are configured to determine whether the mixed signals can be used for determining frequency modulation information. For example, the system can determine whether the FFT sampling rate is fast enough to correctly determine LFM information (e.g., the system samples fast enough to capture portions of each LFM pulse). In accordance with a determination that the system cannot accurately determine frequency modulation for a signal in the environment, the system is configured to generate a message (e.g., to warn a user about indeterminate signals in the environment). In some embodiments, in accordance with this determination, the system is configured to pass the signal to a different component (e.g., an envelope detector) for performing SIGINT on this signal. Although FFT is described as an example here, it should be appreciated that other types of spectral analysis may be performed for determining frequency modulation information.

System 100 allows SIGINT to be performed (in situations where information about the electromagnetic environment may not be known) and implemented using SWaP+C solutions that are suitable for mobile applications. By mixing the first signal 102 and the second signal 104, the sampling rate for performing SIGINT may be greatly reduced, compared to existing solutions such as envelope detection. Reducing the sampling rate reduces power consumption and computational complexity, allowing lower-cost and smaller hardware (e.g., a slower ADC, a lower power-consuming processor, a general purpose processor, a lower-cost processor such as a Raspberry Pi). For example, instead of sampling at 2 GHz or greater, the disclosed systems, devices, and methods allow the sampling rate to be reduced to 1-2 MHz, reducing power consumption and speed requirements by orders of magnitude. Additionally, system 100 allows SIGINT to be performed for different frequency bands and/or different sources simultaneously (as described in more detail herein), which enables wide bandwidth surveillance (e.g., 2-18 GHz) at a lower cost.

Figure 3:
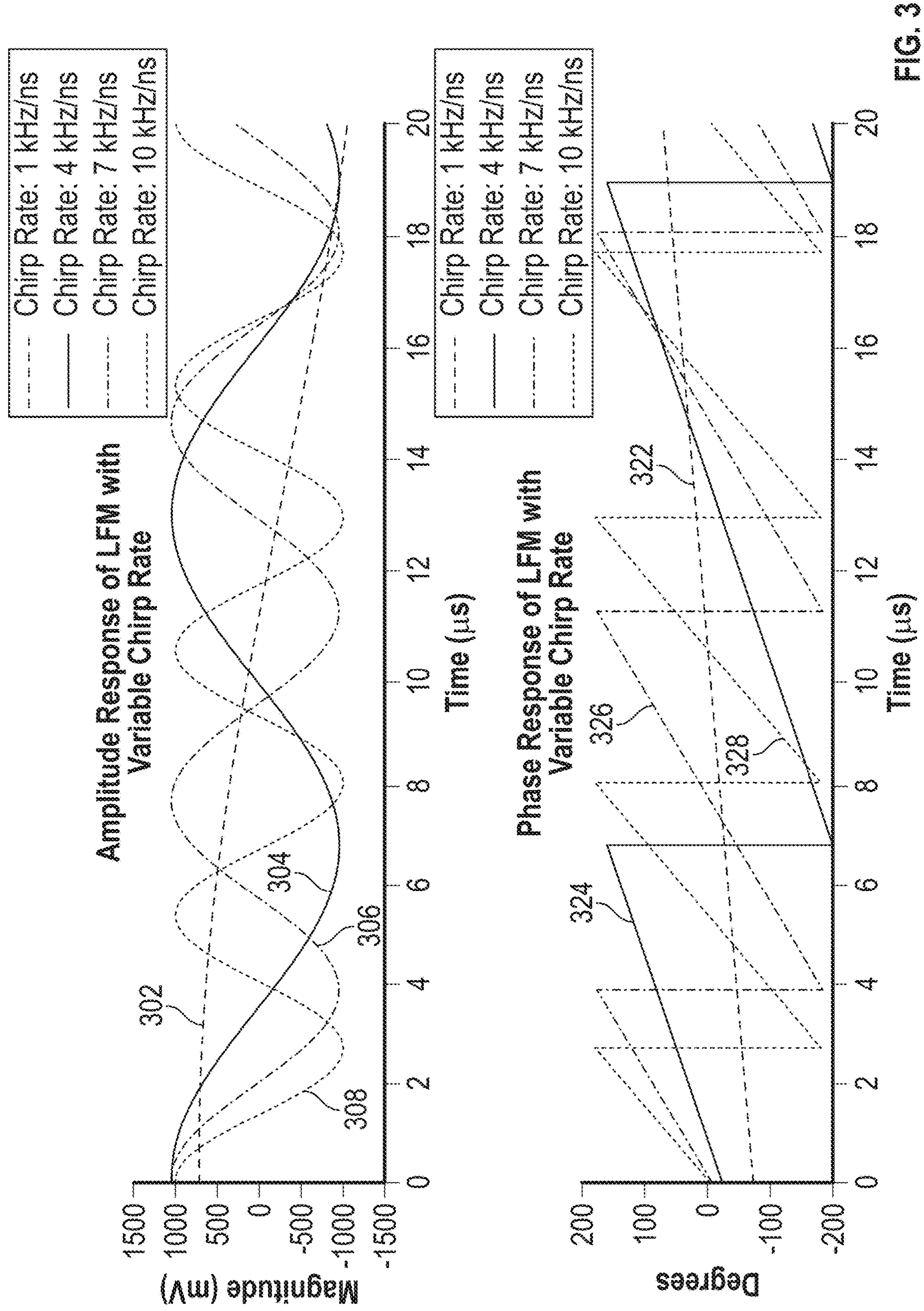
FIG. 3 illustrates exemplary waveforms associated with frequency modulation information, according to embodiments of this disclosure.

FIG. 3 illustrates exemplary waveforms associated with frequency modulation information, according to embodiments of this disclosure. It should be appreciated that the chirp rates described with respect to FIG. 3 are exemplary, and that the first signal may be encoded differently than illustrated.

More specifically, in some embodiments, the first signal 102 is an LFM signal, and FIG. 3 shows example amplitude and phase responses of the first signal 102. FIG. 3 shows four different responses corresponding to LFM chirp rates, which may be associated with four different states of an LFM pulse (e.g., an LFM pulse may be encoded as one of the four states). Waveform 302 shows the amplitude response of an LFM signal having a 1 kHz/ns chirp rate. That is, the frequency of waveform 302 increases at a rate of 1 kHz/ns. Waveform 304 shows the amplitude response of an LFM signal having a 4 kHz/ns chirp rate. That is, the frequency of waveform 304 increases at a rate of 4 kHz/ns. Waveform 306 shows the amplitude response of an LFM signal having a 7 kHz/ns chirp rate. That is, the frequency of waveform 306 increases at a rate of 7 kHz/ns. Waveform 308 shows the amplitude response of an LFM signal having a 10 kHz/ns chirp rate. That is, the frequency of waveform 308 increases at a rate of 10 kHz/ns.

As illustrated, waveform 322 is the phase response corresponding to waveform 302 (phase of amplitude response waveform vs. time). Waveform 324 is the phase response corresponding to waveform 304. Waveform 326 is the phase response corresponding to waveform 306. Waveform 328 is the phase response corresponding to waveform 308.

Returning to FIG. 1, in some embodiments, the system 100 is configured to concurrently determine additional frequency modulation information. For example, the system 100 is configured to concurrently determine one or more of PSK information and LFM information associated with another incoming signal. As another example, the system 100 is configured to concurrently determine one or more of PSK information and LFM information associated with different bands of first signal 102.

In some embodiments, the system 100 is configured to receive a third signal. The third signal may comprise different frequency components than frequency components of the first signal 102. The system 100 is further configured to receive a fourth signal, and the fourth signal is a delayed version of the third signal. For example, the mixer 106 receives the third signal (e.g., received via system 100's antenna) and fourth signal (e.g., delayed by delay component 112) and mixes the third signal and the fourth signal to generate a second mixed signal.

In some embodiments, the system 100 is configured to determine, based on the second mixed signal, one or more of second PSK information associated with the third signal and second LFM information associated with the third signal concurrently with determining the one or more of the first PSK information (associated with first signal 102) and the first LFM information (associated with first signal 102).

Figure 4:
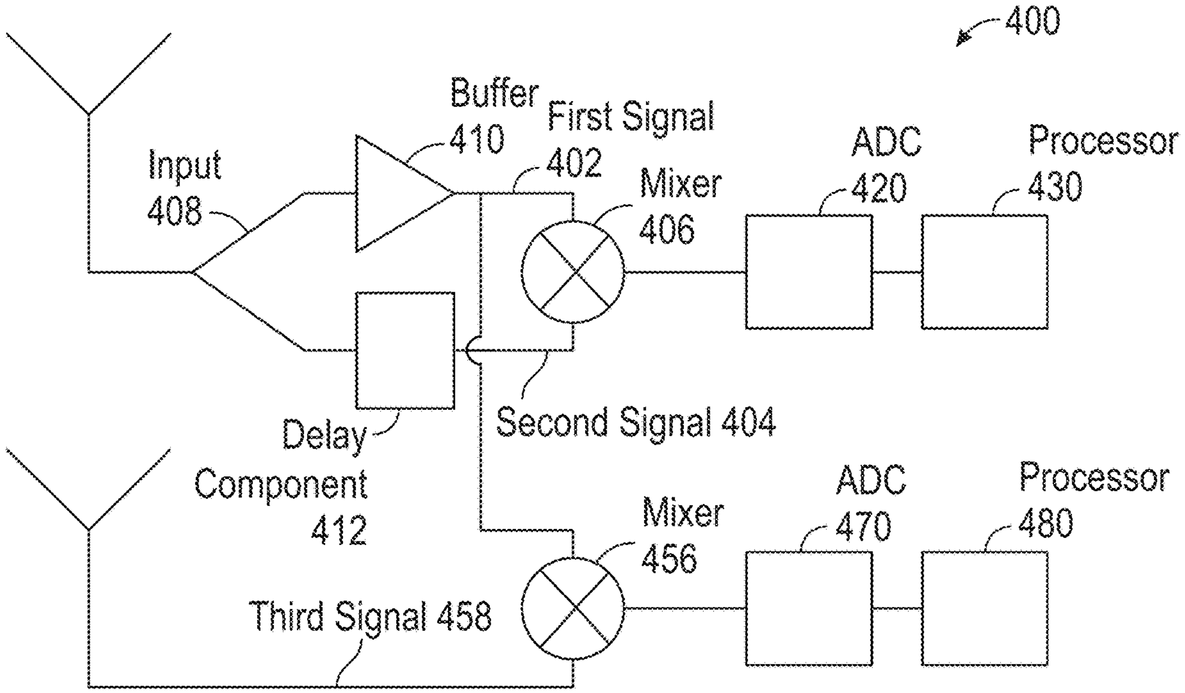
FIG. 4 illustrates an exemplary frequency modulation information detection system, according to embodiments of this disclosure.

FIG. 4 illustrates an exemplary frequency modulation information detection system 400, according to embodiments of this disclosure. In some embodiments, the system 400 comprises mixer 406, processor 430, mixer 456, and processor 480. In some embodiments, the mixer 406 is mixer 106, and the processor 430 is processor 130. In some embodiments, system 400 comprises ADCs 420 and 470. In some embodiments, the ADC 420 is ADC 120.

In some embodiments, the ADC 420 is coupled to the mixer 406 and the processor 430, and the ADC 470 is coupled to the mixer 456 and the processor 480. In some embodiments, the ADC 420 and processor 430 are part of one component, and the ADC 470 and processor 480 are part of one component. In some embodiments, one or more of the ADC 420, processor 430, ADC 470, and processor 480 are part of one component. In some embodiments, the mixer 406 is coupled to the processor 430, and the mixer 456 is coupled to processor 480. It should be appreciated that the system 400 may comprise different configurations from those described for detecting frequency modulation information.

It should be appreciated that system 400 leverages features described with respect to FIG. 1. For example, the system 400 is configured to determine one or more of PSK information and LFM information, as described with respect to FIG. 1.

As described in more detail herein, because the disclosed systems allow a lower power-consuming processor (e.g., a general purpose processor, a lower-cost processor such as a Raspberry Pi) for performing SIGINT, the system 400 is configured to perform analog-to-digital conversion for converting data readable by the processor.

In some embodiments, the mixer 406 is configured to receive a first signal 402 and a second signal 404. The first signal 402 may be received at the RF or LO input of the mixer 406, and the second signal 404 may be received at the other input of the mixer 406. In some embodiments, the first signal 402 is received via input 408. For example, the first signal 402 is associated with a part of an environment being surveyed by the system 400. For example, the system 400 is performing SIGINT of its environment, and the first signal 402 may be from a signal communicated in the environment, such as a radar signal, a jamming signal, or a frequency modulated signal associated with a message or device instructions.

In some embodiments, the first signal 402 is received via an antenna coupled to the input 408. The antenna may be part of system 400 or coupled to the system 400 via an interface of the system 400.

In some embodiments, a frequency of the first signal 402 is 2-18 GHz. Prior to receiving the first signal 402 at the mixer 406, the first signal 402 may be buffered by buffer 410.

In some embodiments, the second signal 404 is a delayed version of the first signal 402. As illustrated, the second signal 404 may be delayed by the delay component 412. The delay component 412 may shift the phase of the first signal 402 to output the second signal 104. In some embodiments, the delay component 412 is controlled by the processor 430. For example, the processor 430 determines an amount of delay applied by the delay component 412 on the first signal 402.

It should be appreciated that the first signal 402 and the second signal 404 may be processed differently than illustrated. For example, the first signal 402 may not be buffered prior to the mixer 406 receiving the first signal. As another example, the first signal 402 and/or the second signal 404 may be further processed, in addition to the illustrated steps.

In some embodiments, the mixer 406 is configured to mix the first signal 402 and the second signal 404 to generate a first mixed signal. In some embodiments, the mixed signal is provided to the ADC 420 and/or the processor 430 for performing the frequency modulation information detection operations described herein (e.g., determining one or more of PSK information associated with the first signal 402, LFM information associated with the first signal 102, an angle of a source associated with the first signal 402).

In some embodiments, the mixer 456 is configured to receive the first signal 402 and a third signal 458. In some embodiments, the first signal 402 is received as described above in parallel with mixer 406. In some embodiments, the third signal 458 is received via a second input of the system 400. For example, the third signal 458 is associated with a part of the environment being surveyed by the system 400 (e.g., the system 400 is performing SIGINT on a band comprising a frequency of the first signal 402 and/or the third signal 458).

In some embodiments, the third signal 458 is received via an antenna coupled to the second input of system 400. The antenna may be part of system 400 or coupled to the system 400 via an interface of the system 400.

In some embodiments, a frequency of the third signal 458 is 2-18 GHz. In some embodiments, the first signal 402 and the third signal 458 are transmitted from the same source.

It should be appreciated that the first signal 402 and the third signal 458 may be processed differently than illustrated. For example, the first signal 402 may not be buffered prior to the mixer 458 receiving the first signal. As another example, the signal 402 may be buffered prior to mixer 458 receiving the first signal. As another example, the first signal 402 and/or the third signal 458 may be further processed, in addition to the illustrated steps. For instance, a delay and/or loss of the first signal 402 may be compensated, prior to the mixer 456 receiving the first signal.

In some embodiments, the mixer 456 is configured to mix the first signal 402 and the third signal 458 to generate a second mixed signal. In some embodiments, the mixed signal is provided to the ADC 470 and/or the processor 480 for performing the frequency modulation information detection operations described herein (e.g., an angle of a source associated with the first signal 402 and/or the third signal 458).

In some embodiments, the angle of the source associated with first signal 402 can be determined based on (1) a delay between the first signal 402 and the second signal 404, and (2) a delay of the third signal 458 (e.g., relative to the first signal 402). In some embodiments, the delay of the third signal 458 is determined based on the second mixed signal from the mixer 456. For example, the delay of the third signal 458 may be determined by comparing the frequencies of the first mixed signal (from mixer 406) and the second mixed signal (from mixer 456).

In some embodiments, the first signal 402 and third signal 458 are LFM signals. As described with respect to FIG. 1, because the first signal 402 is mixed with a delayed version of itself (second signal 404), the frequency of the first mixed signal from the mixer 406 reflects the delay (e.g., the delay applied by delay component 412) between the first signal 402 and the second signal 404. Because the first signal 402 is mixed with the third signal 458, the frequency of the second mixed signal from the mixer 456 reflects the delay between the first signal 402 and the third signal 458. From the frequency difference between the first mixed signal and the second mixed signal, the delay of the third signal 458 can be determined. The chirp rate of the first signal 402 and the third signal 458 are the same, as the input 408 and the third signal 458 comprise the same frequency, with a delay between the signals. The chirp rate of the first signal 402 may be determined based on (1) a delay between the first signal 402 and the second signal 404, and (2) the mixed signal. Based on the chirp rate of the third signal 458 and the frequency difference between the first mixed signal and the second mixed signal, the time delay between the first signal 402 and the third signal 458 may be determined according to equation (1).

In some embodiments, the frequency of the second mixed signal is determined by processor 480, for example, via spectral analysis of the second mixed signal.

Figure 5:
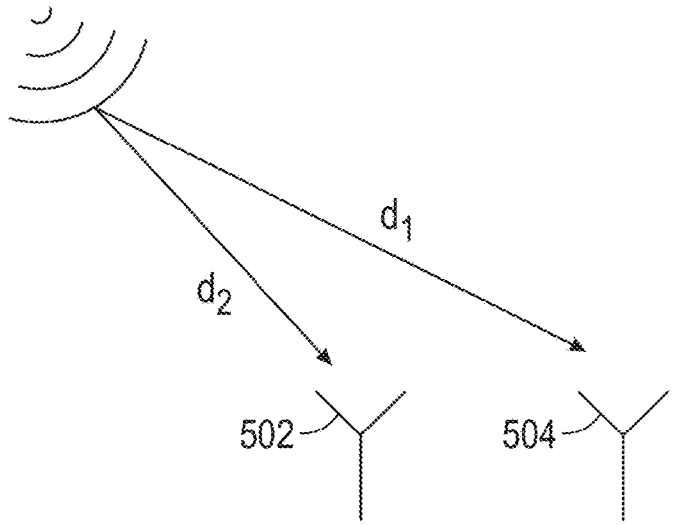
FIG. 5 illustrates an exemplary frequency modulation information detection system, according to embodiments of this disclosure.

Turning to FIG. 5, FIG. 5 illustrates an exemplary frequency modulation information detection system, according to embodiments of this disclosure. In some embodiments, antenna 502 is the antenna for receiving third signal 458, and antenna 504 is the antenna for receiving first signal 402. As illustrated, the antenna 502 is at a distance of $d_2$ from a source of the first signal 402 and the third signal 458, and the antenna 504 is at a distance of $d_1$ from the source. If the delay of the third signal 458 ($\tau_d$) is determined, the difference $d_2$-$d_1$ can be determined according to the following equation:

$$d_2 - d_1 = \tau_d \times \text{speed of light} \quad (3)$$

After the difference $d_2$-$d_1$ is determined, the angle formed by the vectors from the source to the antenna 502 and from the source to the antenna 504 can be determined. This would allow the source direction to be determined (e.g., an angle relative to antenna 502 or antenna 504, an angle relative to a reference point of system 400). For example, the angle of arrival a may be determined according to the following equation:

$$\alpha = \arccos\left(\frac{d_2 - d_1}{\text{Antenna baseline length}}\right) \quad (4)$$

System 400 allows SIGINT to be performed (in situations where information about the electromagnetic environment may not be known) and implemented using SWaP+C solutions that are suitable for mobile applications. By mixing the first signal 402, the second signal 404, and the third signal 458, the sampling rate for performing SIGINT may be greatly reduced, compared to existing solutions such as envelope detection. Reducing the sampling rate reduces power consumption and computational complexity, allowing lower-cost and smaller hardware (e.g., a slower ADC, a lower power-consuming processor, a general purpose processor, a lower-cost processor such as a Raspberry Pi). For example, instead of sampling at 2 GHz or greater, the disclosed systems, devices, and methods allow the sampling rate to be reduced to 1-2 MHz, reducing power consumption and speed requirements by orders of magnitude. Additionally, system 400 allows SIGINT to be performed for different frequency bands and/or different sources simultaneously (as described in more detail herein), which enables wide bandwidth surveillance (e.g., 2-18 GHz) at a lower cost.

In some embodiments, this calculation may yield the four solutions (e.g., positive, negative, and complimentary angles). In some embodiments, an additional condition is determined (e.g., a general direction of the source, an additional condition for eliminating impossible solutions, an initial condition of the calculation), and the additional condition is used to determine the actual solution for determining the source direction.

In some embodiments, the additional condition is determined by performing a second iteration of this calculation. In some embodiments, returning to FIG. 4, the system 400 is configured to generate a third mixed signal, and the source angle is determined further based on the third mixed signal. For example, at a different time, a fourth signal is received via antenna 502 at a location different than third signal 458 (e.g., the antenna 502 moved). The fourth signal is mixed with the signal received by antenna 504 to generate the third mixed signal, and the source angle in this second calculated may be determined as described above. From this second calculation, impossible solutions from the first calculation may be eliminated, yielding the actual solution for determining the source direction.

In some embodiments, the system 400 is configured to compensate for loss associated with the first signal 402 when it is received by the mixer 456, for example, due to the distance between the two antennas. For instance, the source angle may be determined further based on this loss, in addition to the delay between the first and second signals and the delay of the third signal. By accounting for the loss, inaccuracies associated with determination of the third signal delay (caused by the loss) may be compensated. The loss may be determined via calibration of the system 400, for example, by providing known inputs and measuring differences from expected outputs.

In some embodiments, the system 400 is configured to concurrently determine directions of multiple sources. In some embodiments, the system 400 is configured to determine an angle of a second source of a fourth signal concurrently with determining the angle of the first source (e.g., source of the first signal 402 and/or the third signal 458). The fourth signal may comprise frequency components same or different than frequency components of the first signal 402 and/or the third signal 458. For instance, the system 400 is concurrently performing SIGINT on a first band comprising a frequency of the first signal 402 and/or the third signal 458 and a second band comprising a frequency of the fourth signal. The first and second bands may be the same or different. The second source angle may be determined similarly, as described above with respect to the first source angle.

Figure 6:
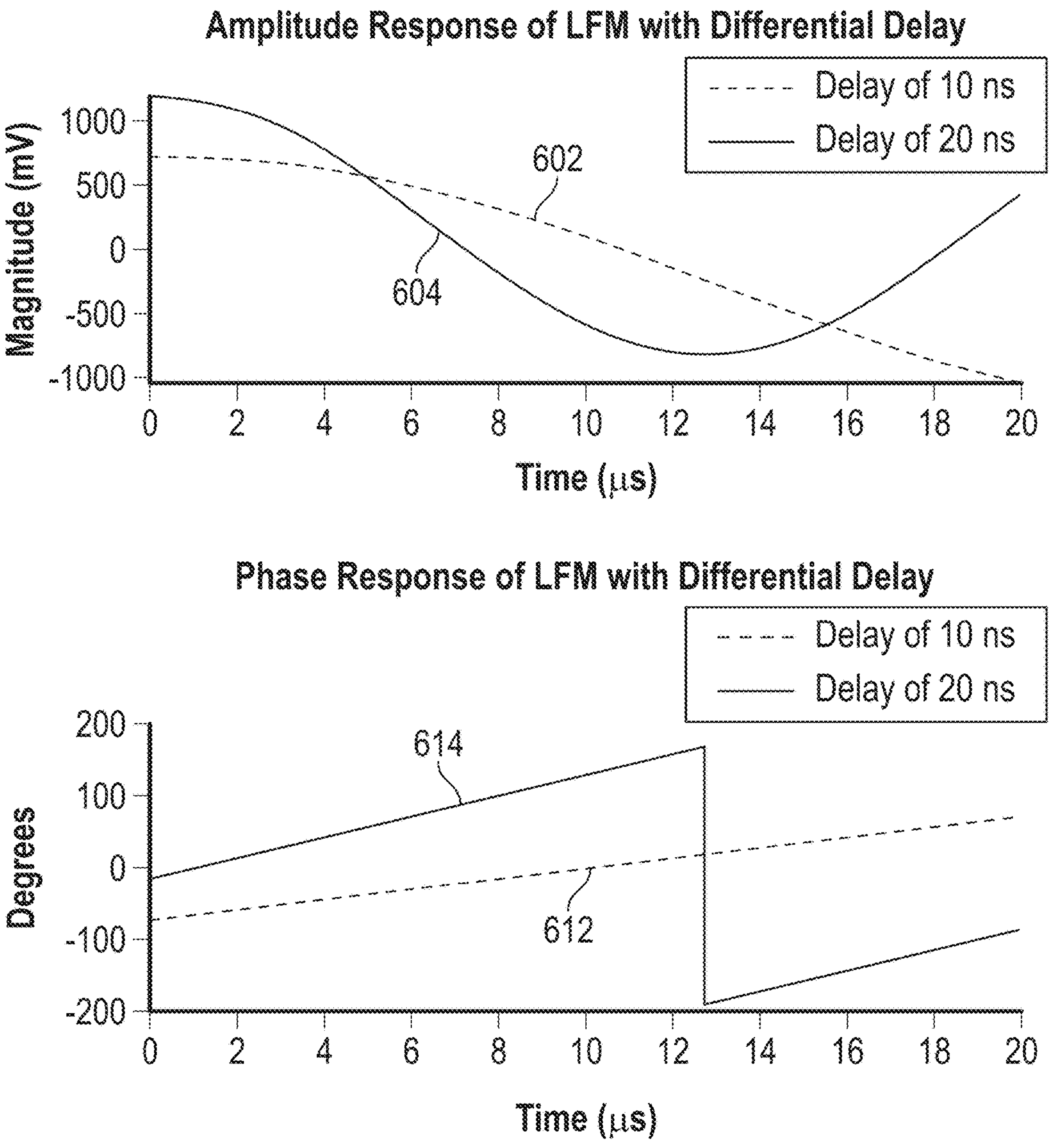
FIG. 6 illustrates exemplary waveforms associated with frequency modulation information, according to embodiments of this disclosure.

FIG. 6 illustrates exemplary waveforms associated with frequency modulation information, according to embodiments of this disclosure. In some embodiments, FIG. 6 illustrates waveforms associated with different LFM signals having different associated delays. Waveform 602 illustrates the amplitude response of a signal having a 10 ns delay (e.g., $\tau_d$ is 10 ns), and waveform 612 illustrates the phase response of this signal. Waveform 604 illustrates the amplitude response of a signal having a 20 ns delay (e.g., $\tau_d$ is 20 ns), and waveform 614 illustrates the phase response of this signal.

Figure 7:
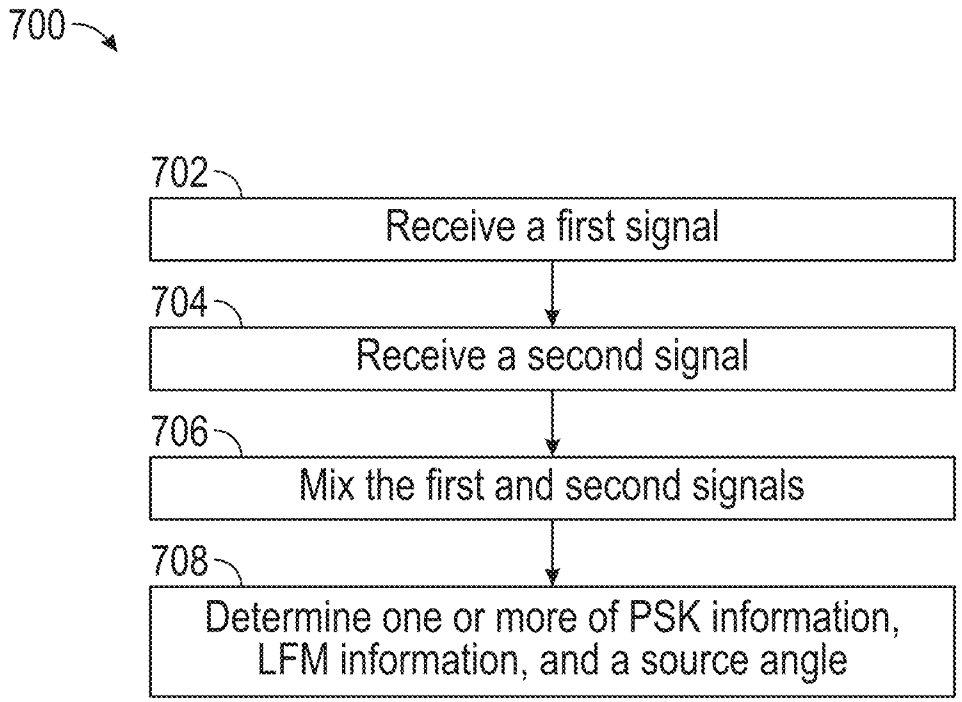
FIG. 7 illustrates an exemplary method for frequency modulation information detection, according to embodiments of this disclosure.

FIG. 7 illustrates an exemplary method 700 for frequency modulation information detection, according to embodiments of this disclosure. In some embodiments, the steps of method 700 are performed by one or more components described with respect to FIGS. 1-6, and/or components of system 800. For example, steps of method 700 are performed by components of a SIGINT system for surveying its electromagnetic environment. For example, the system is part of a mobile system deployed to the field for determining information of signals communicated in the environment. These signals may be various types of signals, including but not limited to radar signals, jamming signals, frequency modulated signals associated with messages or device instructions, phase modulation signals associated with messages or data, and incidental signals within the environment. The system may be part of a mobile platform, such as a handset. The system may be part of a larger platform, such as a base station for transmitting signals, receiving signals, and performing intelligence on signals in its environment.

It should be appreciated that steps described with respect to FIG. 7 are exemplary. The method 700 may include fewer steps, additional steps, or different order of steps than described. It is appreciated that the steps of method 700 leverage the features and advantages described with respect to FIGS. 1-6.

In some embodiments, the method 700 comprises receiving a first signal (step 702). For example, as described with respect to FIG. 1, the system 100 receives the first signal 102 at the mixer 106. As another example, as described with respect to FIG. 4, the system 400 receives the first signal 402 at the mixer 406. The first signal may be from a signal communicated in the environment, such as a radar signal, a jamming signal, or a frequency modulated signal associated with a message or device instructions, and the method 700 comprises steps for performing SIG on these signals. In some embodiments, a frequency of the first signal is 2-18 GHz.

In some embodiments, the method 700 comprises receiving a second signal (step 704). In some embodiments, the second signal is a delayed version of the first signal. For example, as described with respect to FIG. 1, the system 100 receives the second signal 104 at mixer 106, which is a delayed version of the first signal 102. As another example, as described with respect to FIG. 4, the system 400 receives the second signal 404 at mixer 406, which is a delayed version of the second signal 402.

In some embodiments, the method 700 comprises mixing the first signal and the second signal to generate a mixed signal (step 706). For example, as described with respect to FIG. 1, the mixer 106 mixes the first signal 102 and the second signal 104. As another example, as described with respect to FIG. 4, the mixer 406 mixes the first signal 402 and the second signal 404.

In some embodiments, the method 700 comprises determining one or more of PSK information, LFM information, and signal source angle (step 708). In some embodiments, step 708 comprises determining, based on the mixed signal, PSK information associated with the first signal. For instance, as described with respect to FIG. 1, the system 100 is configured to determine PSK information associated with the first signal 102.

In some embodiments, the determination of the PSK information comprises in accordance with a determination that the mixed signal comprises a transition, determining a bit transition in the PSK information. The transition may be caused by a discontinuity in the first signal. For example, as described with respect to FIG. 1, the system 100 is configured to determine a transition in the mixed signal, caused by a discontinuity in the first signal 102, and determine the PSK information based on the transition.

In some embodiments, step 708 comprises determining, based on the mixed signal, LFM information associated with the first signal. For example, as described with respect to FIG. 1, the system 100 is configured to determine LFM information associated with the first signal 102.

In some embodiments, the determination of the LFM information comprises determining a bandwidth of the first signal based on (1) a delay between the first signal and the second signal, (2) a pulse width of the first signal, and (3) the mixed signal. For example, as described with respect to FIG. 1, the first signal 102 may be an LFM signal, and the bandwidth of the first signal 102 can be determined based on based on a delay between the first signal 102 and the second signal 104, a pulse width of the first signal 102, and a frequency of the mixed signal.

In some embodiments, the pulse width of the first signal is determined via performing FFT. For example, as described with respect to FIG. 1, the pulse width of the first signal 102 can be determined via FFT.

In some embodiments, the determination of the LFM information comprises determining a chirp rate of the first signal based on (1) a delay between the first signal and the second signal, and (2) the mixed signal. For example, as described with respect to FIG. 1, the first signal 102 may be an LFM signal, and the chirp rate of the first signal 102 can be determined based on a delay between the first signal 102 and the second signal 104, and a frequency of the mixed signal.

In some embodiments, the method 700 comprises receiving a third signal and a fourth signal, mixing the third signal and the fourth signal to generate a second mixed signal, and concurrently with the determination of the one or more of the first PSK information and the first LFM information, determining, based on the second mixed signal, one or more of second PSK information associated with the third signal and second LFM information associated with the third signal. The third signal comprises different frequency components than frequency components of the first signal, and the fourth signal is a delayed version of the third signal. For example, as described with respect to FIG. 1, the system 100 is configured to concurrently determine one or more of first PSK information, first LFM information, second PSK information, and second PSK information associated with different incoming signals.

In some embodiments, step 708 comprises determining source angle. For example, as described with respect to FIG. 4, the system 400 is configured to determine the angle of the source of the first signal 402 and/or the third signal 458 (e.g., a direction of a radar station transmitting an incoming signal associated with the first signal 402 and/or the third signal 458).

In some embodiments, the method 700 further comprises receiving a third signal, mixing the first signal and the third signal to generate a second mixed signal, determining a delay of the third signal based on the second mixed signal, and determining, based on (1) a delay between the first signal and the second signal and, (2) the delay of the third signal, (3) an angle of a source of the first signal. For example, as described with respect to FIG. 4, the system 400 is configured to receive third signal 458, and the mixer 456 mixes the first signal 402 and the third signal 458 to generate a second mixed signal. The system 400 is configured to determine the angle of the source based on the delay between the first signal 402 and the second signal 404, and the delay of the third signal 458, which is determined based on the second mixed signal.

In some embodiments, the method 700 further comprises generating a third mixed signal. The angle of the source is determined further based on the third mixed signal. For example, as described with respect to FIGS. 4 and 5, a second signal is received by the antenna 502, and a second calculation is performed for determining the actual solution for source angle determination.

In some embodiments, the angle of the source is determined further based on a loss associated with the mixing of the first signal and the third signal. For example, as described with respect to FIG. 4, the source angle determination may comprise compensating for loss associated with first signal 402 received by the mixer 456.

In some embodiments, the loss is determined via calibration. For example, as described with respect to FIG. 4, the loss associated with first signal 402 received by the mixer 456 is determined via calibration.

In some embodiments, the method 700 further comprises concurrently with the determination of the angle of the first source, determining an angle of a second source of a fourth signal. The fourth signal comprises frequency components different than frequency components of the first signal. For example, as described with respect to FIG. 4, the system 400 is configured to determine an angle of a second source, concurrently with determining the angle of the first source.

Figure 8:
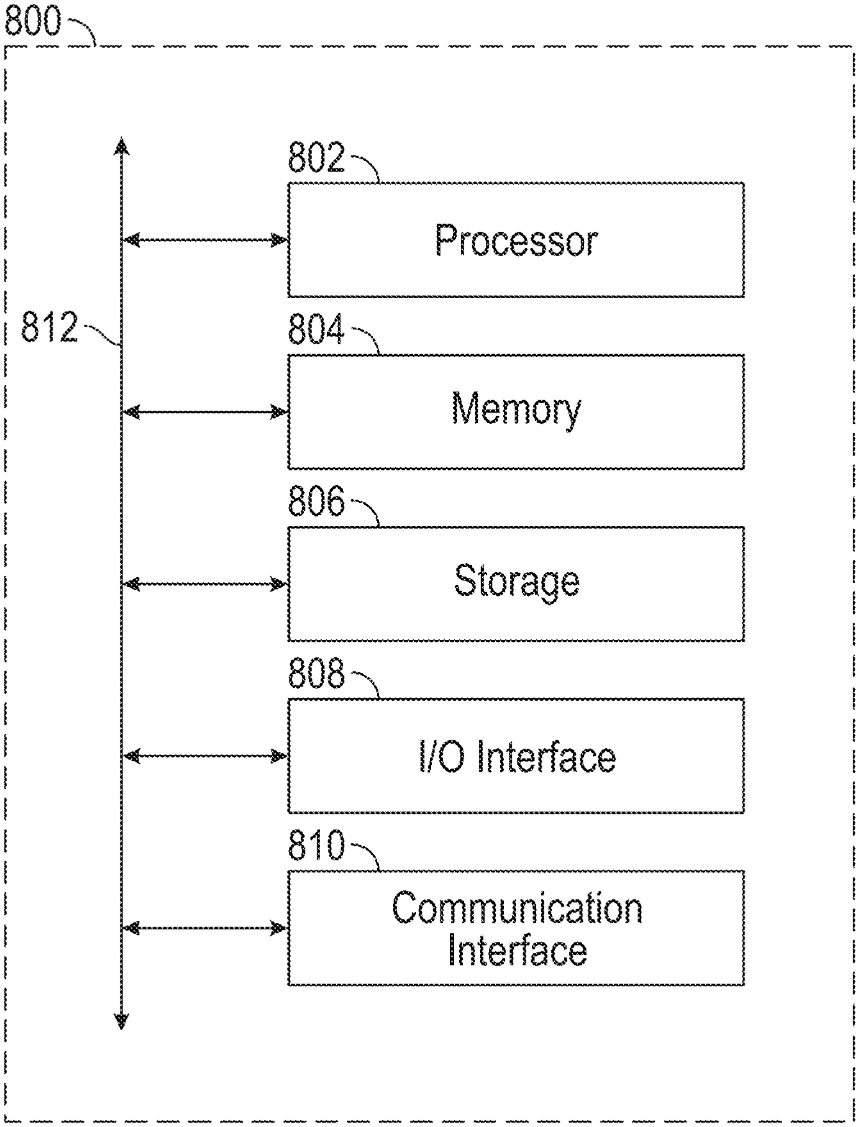
FIG. 8 illustrates an exemplary computer system, according to embodiments of this disclosure.

Turning to FIG. 8, FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 300. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example, and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In some embodiments, the computer system 800 is coupled to any of the systems described with respect to FIGS. 1-7. In some embodiments, any of the systems described in FIGS. 1-7 is a part of the computer system 800. In some embodiments, the computer system 800 is configured to control the components and/or perform operations of the components, as described with respect to FIGS. 1 and 4. For example, the computer system 800 may be configured to perform one or more of receiving an incoming signal, mixing signals, analog-to-digital conversion, and frequency modulation detection operations (e.g., determining PSK information, determining LFM information, determining source direction).

The computer system 800 may be coupled to the mixer and perform operations for determining frequency modulation information. In some embodiments, the computer system 800 is configured to perform the operations described with respect to FIGS. 1-7. In some embodiments, the computer system 800 is configured to receive an output of the mixer and perform analog-to-digital conversion for determining frequency modulation information. In some embodiments, the computer system 800 is configured to receive an output of the analog-to-digital converter, which comprise a digitized version of a mixer output.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example, and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example, and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor. In some embodiments, operations of the processor 802 are implemented via field-programmable gate arrays (FPGAs).

In some embodiments, the processor 802 is coupled to any of the components described with respect to FIGS. 1-7. In some embodiments, the processor 802 executes instructions to for determining frequency modulation information. In some embodiments, the processor 802 is coupled to one or more components of systems 100, 400, and the system described with respect to FIG. 5. For example, the processor 802 is configured to perform operations described with respect to one or more of ADCs and processors described with respect to FIGS. 1 and 4.

In particular embodiments, memory 804 includes main memory for storing instructions for processor 802 to execute or data for processor 802 to operate on. As an example, and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory. In some embodiments, the memory 804 stores instructions and inputs for determining frequency modulation information.

In particular embodiments, storage 806 includes mass storage for data or instructions. As an example, and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example, and not by way of limitation, an I/O device may include a keyboard, keypad, microphone, monitor, mouse, printer, scanner, speaker, still camera, stylus, tablet, touch screen, trackball, video camera, sensors, markers, antennas, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. In some embodiments, the communication interface 810 comprises one or more antennas described with respect to FIGS. 1, 4, and 5. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example, and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In some embodiments, a non-transitory computer readable storage medium stores one or more programs, and the one or more programs includes instructions. When the instructions are executed by an electronic device, for example components of system 100, system 400, a system coupled to antennas 502 and/or 504, computer system 800, with one or more processors and memory, the instructions cause the electronic device to perform the methods described with respect to FIGS. 1-7.

In some embodiments, a method for determining frequency modulation information comprises: receiving a first signal; receiving a second signal, the second signal being a delayed version of the first signal; mixing the first signal and the second signal to generate a mixed signal; and determining, based on the mixed signal, one or more of phase-shift keying (PSK) information associated with the first signal and linear frequency modulation (LFM) information associated with the first signal.

In some embodiments, determining the PSK information comprises in accordance with a determination that the mixed signal comprises a transition, determining a bit transition in the PSK information. The transition is caused by a discontinuity in the first signal.

In some embodiments, determining the LFM information comprises determining a bandwidth of the first signal based on (1) a delay between the first signal and the second signal, (2) a pulse width of the first signal, and (3) the mixed signal.

In some embodiments, the pulse width of the first signal is determined via performing Fast Fourier Transform (FFT) to determine a plurality of frequency bins and identifying a period corresponding to the frequency bin of the plurality of frequency bins having the highest energy.

In some embodiments, determining the LFM information comprises determining a chirp rate of the first signal based on (1) a delay between the first signal and the second signal, and (2) the mixed signal.

In some embodiments, the method further comprises: receiving a third signal; mixing the first signal and the third signal to generate a second mixed signal; determining a delay of the third signal based on the second mixed signal; and determining, based on (1) a delay between the first signal and the second signal, and (2) the delay of the third signal, an angle of a source of the first signal.

In some embodiments, the method further comprises generating a third mixed signal. The angle of the source is determined further based on the third mixed signal.

In some embodiments, the angle of the source is determined further based on a loss associated with mixing the first signal and the third signal.

In some embodiments, the loss is determined via calibration.

In some embodiments, the method comprises concurrently with determining the angle of the first source, determining an angle of a second source of a fourth signal. The fourth signal comprises frequency components different than frequency components of the first signal.

In some embodiments, the first and second signals are received at a first mixer and the third signal is received at a second mixer.

In some embodiments, a frequency of the first signal is 2-18 GHz.

In some embodiments, the method further comprises: receiving a third signal, the third signal comprising different frequency components than frequency components of the first signal; receiving a fourth signal, the fourth signal being a delayed version of the third signal; mixing the third signal and the fourth signal to generate a second mixed signal; and concurrently with determining the one or more of the first PSK information and the first LFM information, determining, based on the second mixed signal, one or more of second PSK information associated with the third signal and second LFM information associated with the third signal.

In some embodiments, a system is configured to perform any of the above methods.

In some embodiments, a system comprises a mixer configured to: receive a first signal; receive a second signal, the second signal being a delayed version of the first signal; and mix the first signal and the second signal to generate a mixed signal. The system further comprises one or more processors configured to perform a method comprising determining, based on the mixed signal, one or more of PSK information associated with the first signal and LFM information associated with the first signal.

In some embodiments, the system further comprises an analog-to-digital converter (ADC). The ADC is configured to convert the mixed signal into a digital signal, and the one or more of the PSK information and the LFM information are determined based on the digital signal.

In some embodiments, determining the PSK information comprises in accordance with a determination that the mixed signal comprises a transition, determining a bit transition in the PSK information. The transition is caused by a discontinuity in the first signal.

In some embodiments, determining the LFM information comprises determining a bandwidth of the first signal based on (1) a delay between the first signal and the second signal, (2) a pulse width of the first signal, and (3) the mixed signal.

In some embodiments, determining the LFM information comprises determining a chirp rate of the first signal based on (1) a delay between the first signal and the second signal, and (2) the mixed signal.

In some embodiments, the system comprises a second mixer configured to: receive a third signal; and mix the first signal and the third signal to generate a second mixed signal. The method further comprises: determining a delay of the third signal based on the second mixed signal; and determining, based on a delay between (1) the first signal and the second signal, and (2) the delay of the third signal, an angle of a source of the first signal.

In some embodiments, the system further comprises a second mixer configured to: receive a third signal, the third signal comprising different frequency components than frequency components of the first signal; receive a fourth signal, the fourth signal being a delayed version of the third signal; and mix the third signal and the fourth signal to generate a second mixed signal. The method further comprises concurrently with determining the one or more of the first PSK information and the first LFM information, determining, based on the second mixed signal, one or more of second PSK information associated with the third signal and second LFM information associated with the third signal.

In some embodiments, a non-transitory computer-readable medium stores one or more instructions, which, when executed by one or more processors of a system, cause the system to perform a method comprising: receiving a first signal; receiving a second signal, the second signal being a delayed version of the first signal; mixing the first signal and the second signal to generate a mixed signal; and determining, based on the mixed signal, one or more of PSK information associated with the first signal and LFM information associated with the first signal.

In some embodiments, a non-transitory computer-readable medium stores one or more instructions, which, when executed by one or more processors of a system, cause the system to perform any of the above methods.

Although "electrically coupled" and "coupled" are used to describe the electrical connections between two electronic components or elements in this disclosure, it is understood that the electrical connections do not necessarily need direct connection between the terminals of the components or elements being coupled together. For example, electrical routing connects between the terminals of the components or elements being electrically coupled together. In another example, a closed (conducting or an "on") switch is connected between the terminals of the components being coupled together. In yet another example, additional elements connect between the terminals of the components being coupled together without affecting the characteristics of the circuit. For example, buffers, amplifiers, and passive circuit elements can be added between components or elements being coupled together without affecting the characteristics of the disclosed circuits and departing from the scope of this disclosure.

Those skilled in the art will recognize that the systems described herein are representative, and deviations from the explicitly disclosed embodiments are within the scope of the disclosure.

Although the disclosed embodiments have been fully described with reference to the accompanying drawings, it is to be noted that various changes and modifications will become apparent to those skilled in the art. Such changes and modifications are to be understood as being included within the scope of the disclosed embodiments as defined by the appended claims.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The invention claimed is:

1. A method for determining frequency modulation information, the method comprising:

receiving a first signal;

receiving a second signal, wherein the second signal is a delayed version of the first signal;

mixing the first signal and the second signal to generate a mixed signal; and determining, based on the mixed signal, one or more of phase-shift keying (PSK) information associated with the first signal and linear frequency modulation (LFM) information associated with the first signal.

2. The method of claim 1, wherein said determining the PSK information comprises in accordance with a determination that the mixed signal comprises a transition, determining a bit transition in the PSK information, wherein the transition is caused by a discontinuity in the first signal.

3. The method of claim 1, wherein said determining the LFM information comprises determining a bandwidth of the first signal based on (1) a delay between the first signal and the second signal, (2) a pulse width of the first signal, and (3) the mixed signal.

4. The method of claim 3, wherein the pulse width of the first signal is determined via performing Fast Fourier Transform (FFT) to determine a plurality of frequency bins and identifying a period corresponding to the frequency bin of the plurality of frequency bins having the highest energy.

5. The method of claim 1, wherein said determining the LFM information comprises determining a chirp rate of the first signal based on (1) a delay between the first signal and the second signal, and (2) the mixed signal.

6. The method of claim 1, further comprising:

receiving a third signal;

mixing the first signal and the third signal to generate a second mixed signal;

determining a delay of the third signal based on the second mixed signal; and determining, based on (1) a delay between the first signal and the second signal, and (2) the delay of the third signal, an angle of a source of the first signal.

7. The method of claim 6, further comprising generating a third mixed signal, wherein the angle of the source is determined further based on the third mixed signal.

8. The method of claim 6, wherein the angle of the source is determined further based on a loss associated with said mixing the first signal and the third signal.

9. The method of claim 8, wherein the loss is determined via calibration.

10. The method of claim 6, further comprising concurrently with said determining the angle of the source of the first signal, determining an angle of a second source of a fourth signal, wherein the fourth signal comprises frequency components different than frequency components of the first signal.

11. The method of claim 6, wherein the first and second signals are received at a first mixer and the third signal is received at a second mixer.

12. The method of claim 1, wherein a frequency of the first signal is 2-18 GHz.

13. The method of claim 1, further comprising:

receiving a third signal, wherein the third signal comprises different frequency components than frequency components of the first signal;

receiving a fourth signal, wherein the fourth signal is a delayed version of the third signal;

mixing the third signal and the fourth signal to generate a second mixed signal; and concurrently with said determining the one or more of the PSK information and the LFM information, determining, based on the second mixed signal, one or more of second PSK information associated with the third signal and second LFM information associated with the third signal.

14. A system, comprising:

a mixer configured to:

receive a first signal;

receive a second signal, wherein the second signal is a delayed version of the first signal; and mix the first signal and the second signal to generate a mixed signal; and one or more processors configured to perform a method comprising determining, based on the mixed signal, one or more of phase-shift keying (PSK) information associated with the first signal and linear frequency modulation (LFM) information associated with the first signal.

15. The system of claim 14, further comprising an analog-to-digital converter (ADC), wherein:

the ADC is configured to convert the mixed signal into a digital signal, and the one or more of the PSK information and the LFM information are determined based on the digital signal.

16. The system of claim 14, wherein said determining the PSK information comprises in accordance with a determination that the mixed signal comprises a transition, determining a bit transition in the PSK information, wherein the transition is caused by a discontinuity in the first signal.

17. The system of claim 14, wherein said determining the LFM information comprises determining a bandwidth of the first signal based on (1) a delay between the first signal and the second signal, (2) a pulse width of the first signal, and (3) the mixed signal.

18. The system of claim 14, wherein said determining the LFM information comprises determining a chirp rate of the first signal based on (1) a delay between the first signal and the second signal, and (2) the mixed signal.

19. The system of claim 14, further comprising a second mixer configured to:

receive a third signal; and mix the first signal and the third signal to generate a second mixed signal, wherein the method further comprises:

determining a delay of the third signal based on the second mixed signal; and determining, based on a delay between (1) the first signal and the second signal, and (2) the delay of the third signal, an angle of a source of the first signal.

20. The system of claim 14, further comprising a second mixer configured to:

receive a third signal, wherein the third signal comprises different frequency components than frequency components of the first signal;

receive a fourth signal, wherein the fourth signal is a delayed version of the third signal; and mix the third signal and the fourth signal to generate a second mixed signal, wherein the method further comprises concurrently with said determining the one or more of the PSK information and the LFM information, determining, based on the second mixed signal, one or more of second PSK information associated with the third signal and second LFM information associated with the third signal.

21. A non-transitory computer-readable medium storing one or more instructions, which, when executed by one or more processors of a system, cause the system to perform a method comprising:

receiving a first signal;

receiving a second signal, wherein the second signal is a delayed version of the first signal;

mixing the first signal and the second signal to generate a mixed signal; and determining, based on the mixed signal, one or more of phase-shift keying (PSK) information associated with the first signal and linear frequency modulation (LFM) information associated with the first signal.

* * * * *